US012771963B2

(12) United States Patent
Aggarwal et al.

(10) Patent No.: US 12,771,963 B2
(45) Date of Patent: Oct. 20, 2026

(54) DYNAMIC BIT-DEPTH IMAGE CAPTURE FOR TARGET LOCATIONS

(71) Applicant: QUALCOMM Incorporated, San Diego, CA (US)

(72) Inventors: Saurabh Aggarwal, Bengaluru (IN); Abhijeet Dey, Bengaluru (IN); Shrey Shailesh Gadiya, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 18/969,424

(22) Filed: Dec. 5, 2024

(65) Prior Publication Data

US 2026/0164145 A1 Jun. 11, 2026

(51) Int. Cl.
*H04N 25/705* (2023.01)
*H04N 23/76* (2023.01)
*H04N 25/47* (2023.01)

(52) U.S. Cl.
CPC ........... *H04N 25/705* (2023.01); *H04N 23/76* (2023.01); *H04N 25/47* (2023.01)

(58) Field of Classification Search
CPC ....... H04N 25/705; H04N 25/47; H04N 25/76
USPC .......................................................... 348/294
See application file for complete search history.

(56) References Cited

U.S. PATENT DOCUMENTS 11,838,657 B2 * 12/2023 Jeong ..................... H04N 23/65
11,949,879 B2 * 4/2024 Cui ....................... H04N 19/119
12,094,141 B2 * 9/2024 Vavintaparthi ........... G06T 3/40
12,217,371 B1 * 2/2025 Mirhosseini ............ G06T 11/10
12,581,100 B1 * 3/2026 Lapicque ............. H04N 19/182
2011/0274177 A1 * 11/2011 Park ....................... H04N 19/91 375/E7.076
2019/0156516 A1 * 5/2019 Nikkanen ................. G06T 5/50
2021/0084334 A1 * 3/2021 Tsukuba ................. H04N 19/60
2021/0132688 A1 * 5/2021 Kim ..................... G06N 3/0442
2022/0053150 A1 * 2/2022 Jeong ..................... H04N 23/65
2023/0281848 A1 * 9/2023 Vavintaparthi ........... G06T 3/40 382/299
2024/0185390 A1 * 6/2024 Jiang ......................... G06T 5/20
2024/0249423 A1 * 7/2024 Feng .................... H04N 23/635
2024/0320839 A1 * 9/2024 Ebata ........................ G06T 7/20
2025/0104185 A1 * 3/2025 Kota ..................... G06T 3/4038
2026/0134526 A1 * 5/2026 Lindgren .................. G06T 5/92

* cited by examiner

*Primary Examiner* — Pritham D Prabhakher

(74) *Attorney, Agent, or Firm* — Qualcomm/Norton Rose Fulbright US LLP

(57) ABSTRACT

This disclosure provides systems, methods, and devices for machine learning techniques that optimize image data processing by adjusting bit-depth and resolution based on target locations within an image frame, such as for use with dual conversion gain (DCG) sensors. In one aspect, a method is provided that includes receiving at least one image frame and a target location, determining three regions within the image frame based on the target location, and generating output image data with different bit-depths for each region. The regions can include a high bit-depth first region, a second region with a medium bit-depth, and a third region with a lower bit-depth. The method may also include adjusting the resolution in these regions. Other aspects are discussed.

20 Claims, 7 Drawing Sheets

DYNAMIC BIT-DEPTH IMAGE CAPTURE FOR TARGET LOCATIONS

TECHNICAL FIELD

Aspects of the present disclosure relate generally to image processing, and more particularly, to improved data rate efficiency for image capture and processing. Some features may enable and provide improved image processing, including dynamically adjusting bit depths for captured images based on target locations.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The amount of image data captured by an image sensor has increased through subsequent generations of image capture devices. The amount of information captured by an image sensor is related to a number of pixels in an image sensor of the image capture device, which may be measured as a number of megapixels indicating the number of millions of pixel sensors in the image sensor. For example, a 12-megapixel image sensor has 12 million pixels. Higher megapixel values generally represent higher resolution images that are more desirable for viewing by the user.

The increasing amount of image data captured by the image capture device has some negative effects that accompany the increasing resolution obtained by the additional image data. Additional image data increases the amount of processing performed by the image capture device in determining image frames and videos from the image data, as well as in performing other operations related to the image data. For example, the image data may be processed through several processing blocks for enhancing the image before the image data is displayed to a user on a display or transmitted to a recipient in a message. Each of the processing blocks consumes additional power proportional to the amount of image data, or number of megapixels, in the image capture. The additional power consumption may shorten the operating time of an image capture device using battery power, such as a mobile phone.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present techniques relate to adaptive image processing, including bit-depth management in image sensors, such as Dual Conversion Gain (DCG) image sensors. These techniques may optimize data rate and power consumption through the use of foveated image capture and processing. For instance, a DCG image sensor may be configured to dynamically adjust the bit-depth and resolution across different regions of an image based on a target location (such as a user gaze location). This can include determining a high bit-depth for the fovea region, a medium bit-depth for the mid-fovea, and a lower bit-depth for the periphery. The bit-depths may be selected based on real-time scene analysis and stability of brightness across frames.

One aspect provides a method that includes receiving at least one image frame and a target location; determining, based on the target location, a first region, a second region, and a third region within the at least one image frame; and determining, based on the at least one image frame, an output image data with (i) a first bit-depth in the first region, (ii) a second bit-depth in the second region, and (iii) a third bit-depth in the third region.

Another aspect provides an apparatus that includes an image sensor configured to receive at least one image frame and a target location; determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region.

A further aspect provides an image capture device that includes an image sensor configured to receive at least one image frame and a target location; determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, virtual reality (VR) headsets, extended reality (XR) headsets, mixed reality (MR) headsets, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
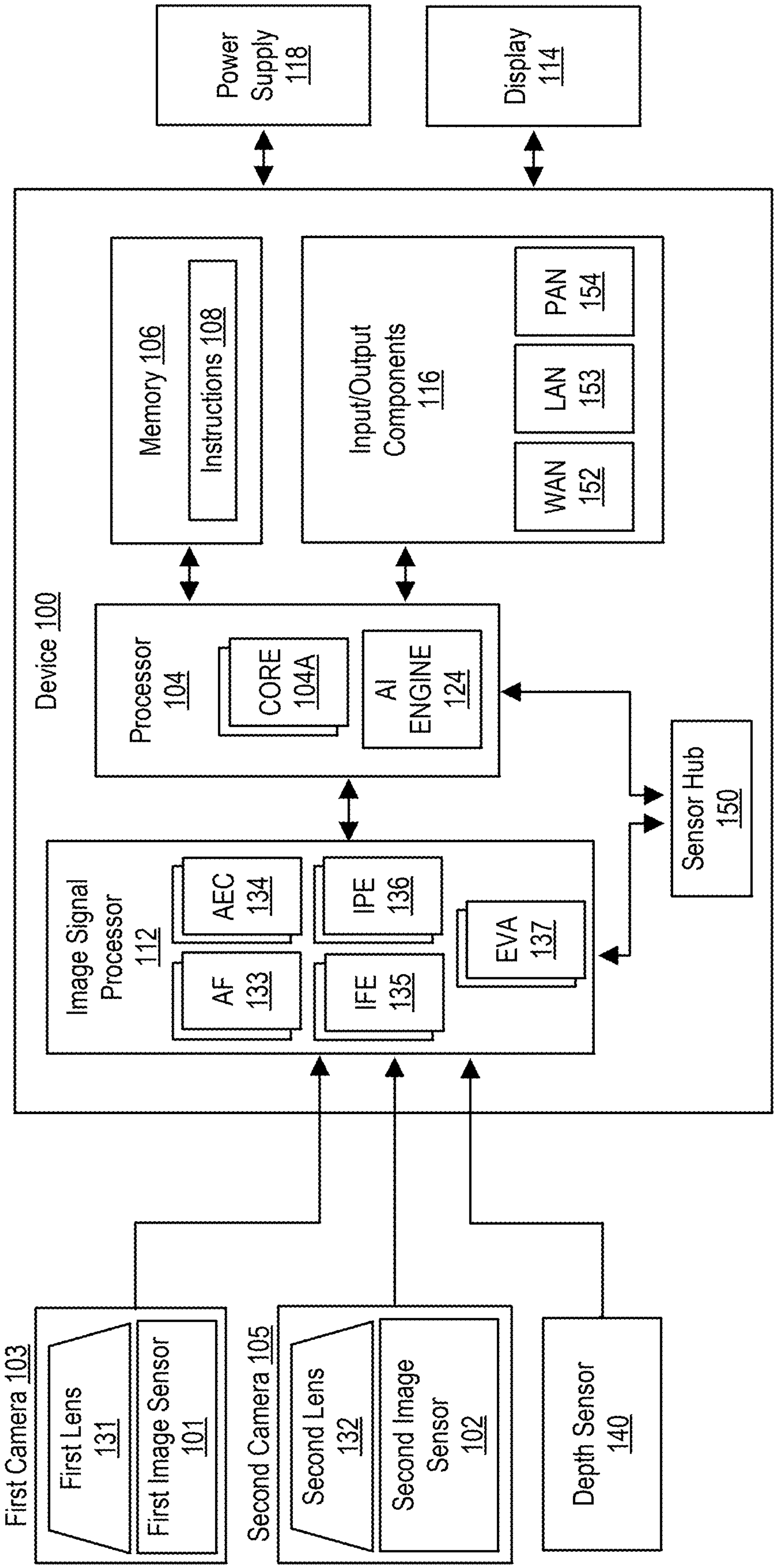
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Current image sensors, particularly those used in Virtual Reality (VR) and Extended Reality (XR) applications, demand high dynamic range (HDR) imaging capabilities. The prevalent methods for achieving HDR, such as time-multiplexed solutions like sequential HDR (sHDR) and multi-frame HDR (MFHDR), typically involve capturing multiple images at different exposures and combining them. Although effective in static environments, these methods can be challenging in applications requiring high frame rates and multiple concurrent camera setups, which often lead to lower exposure times and higher data rates.

Time-multiplexed HDR techniques pose several challenges, including increased data rates, higher power consumption, and a need for extensive ISP front-end area to process the high bit-depth outputs from typical sensors. This increase in ISP area and data rate affects overall power consumption and system efficiency, limiting the practicality of these methods in high-performance, low-latency environments like XR.

Another problem is the stability of brightness across images. When brightness levels fluctuate significantly, it becomes challenging to perform consistent image processing, leading to potential image quality issues and user discomfort. Furthermore, existing techniques may not take into account the perceptual significance of different image regions, which could be crucial for optimizing processing resources more effectively.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

One solution to this problem is to dynamically adjust the bit-depth of the image data based on a target location within a sensor's field of view. An image sensor may be configured to process different regions of an image frame at varying bit-depths, where a fovea region is processed at the highest bit-depth, a mid-fovea at a medium bit-depth, and a periphery at the lowest bit-depth. This adaptive bit-depth assignment may be determined by real-time scene analysis and brightness stability across frames, allowing optimal use of bandwidth and processing power. The image sensor may be configured to adjust both the bit-depth and the resolution in these regions. For example, the fovea region may be captured at the sensor's native resolution, while the mid-fovea and periphery may be progressively downscaled. In certain aspects, further data savings may be achieved using scene analysis to determine brightness stability across multiple frames. By evaluating exposure statistics, pixel mean values, and histograms of brightness distribution, the system can make informed decisions about appropriate bit-depth adjustments, and may be able to further lower bit-depths when brightness is stable, without sacrificing dynamic range or image quality.

Stated differently, increased dynamic range may be crucial for Image Quality (IQ) in Video See-Through (VST) applications. However, time-multiplexed solutions (e.g., sHDR or MFHDR) may not be feasible due to Frame Per Second (FPS) requirements. Dual Conversion Gain (DCG) sensors may be utilized for increased dynamic range but may require increased data rates over the Physical interface (PHY) due to higher bandwidth demands. Furthermore, the bit-depth outputs for DCG sensors may necessitate a larger ISP front-end area. The present techniques may reduce data rate and area requirements by adjusting bit-depths for different regions, namely the fovea, mid-fovea, and periphery regions. For instance, using 16 bits for the fovea region, 14 bits for the mid-fovea region, and 10 bits for the periphery region may achieve acceptable IQ for the Human Visual System (HVS) at a lower cost.

Particular implementations of the subject matter described in this disclosure may be implemented to realize one or more of the following potential advantages or benefits. In some aspects, the present disclosure provides techniques for adaptive bit-depth management and dynamic resolution control that may be particularly beneficial in optimizing power consumption and data rate in XR applications. For example, reducing the bit-depth from 16 bits in the fovea to 14 bits in the mid-fovea and 10 bits in the periphery, the data rate is significantly lowered, leading to a potential savings of approximately 1 Gbps in a 90 FPS, 4000×4000 sensor setup. Similarly, the reduced front-end area of the ISP may result in approximately 15.8% savings in front end area requirements for a similar setup. Incorporating scene analysis and brightness stability checks also allows for further bit-depth optimization based on real-time content, thereby providing dynamic adjustments that can lead to additional data rate and power savings.

These techniques may result in lower power consumption and reduced processing requirements not only at the sensor level but also within downstream components like the ISP. By minimizing the need for high-bit-depth processing across the entire image, the techniques can help in designing more efficient ISPs that consume less power and have a smaller footprint. This may be particularly beneficial for portable devices like VR headsets, where battery life and device weight are critical considerations.

For end users, these techniques may ensure higher image quality where it is most perceptible, thereby enhancing the user experience in VR and XR environments. With the dynamic adjustment of bit-depth and resolution, XR devices can offer longer battery life and more efficient sensor performance, making them more practical and user-friendly. Enhanced image quality in the fovea region ensures that users perceive high-definition content precisely where they are focusing, adding to the realism and immersion of the XR experience.

An example device for capturing image frames using one or more image sensors, such as an extended reality (XR) headset, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as physical buttons.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein. For example, execution of the instructions can instruct the image signal processor 112 to begin or end capturing an image frame or a sequence of image frames, as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by dynamically adjusting bit-depths, resolutions, or both for different regions of captured images. One example method of operating one or more cameras, such as camera 103, is shown in FIG. 2 and described below.

Figure 2:
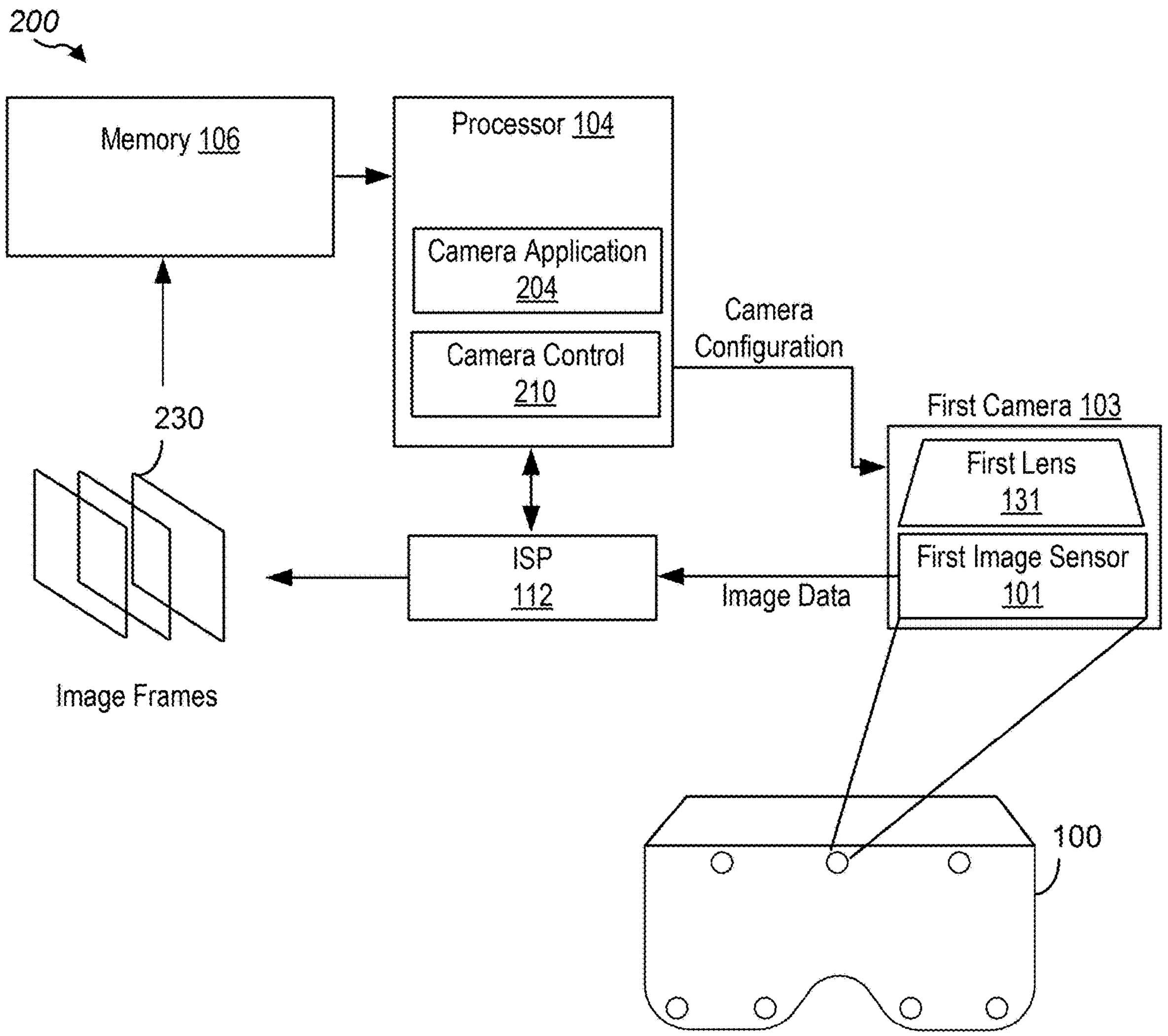
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0.

The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 3A:
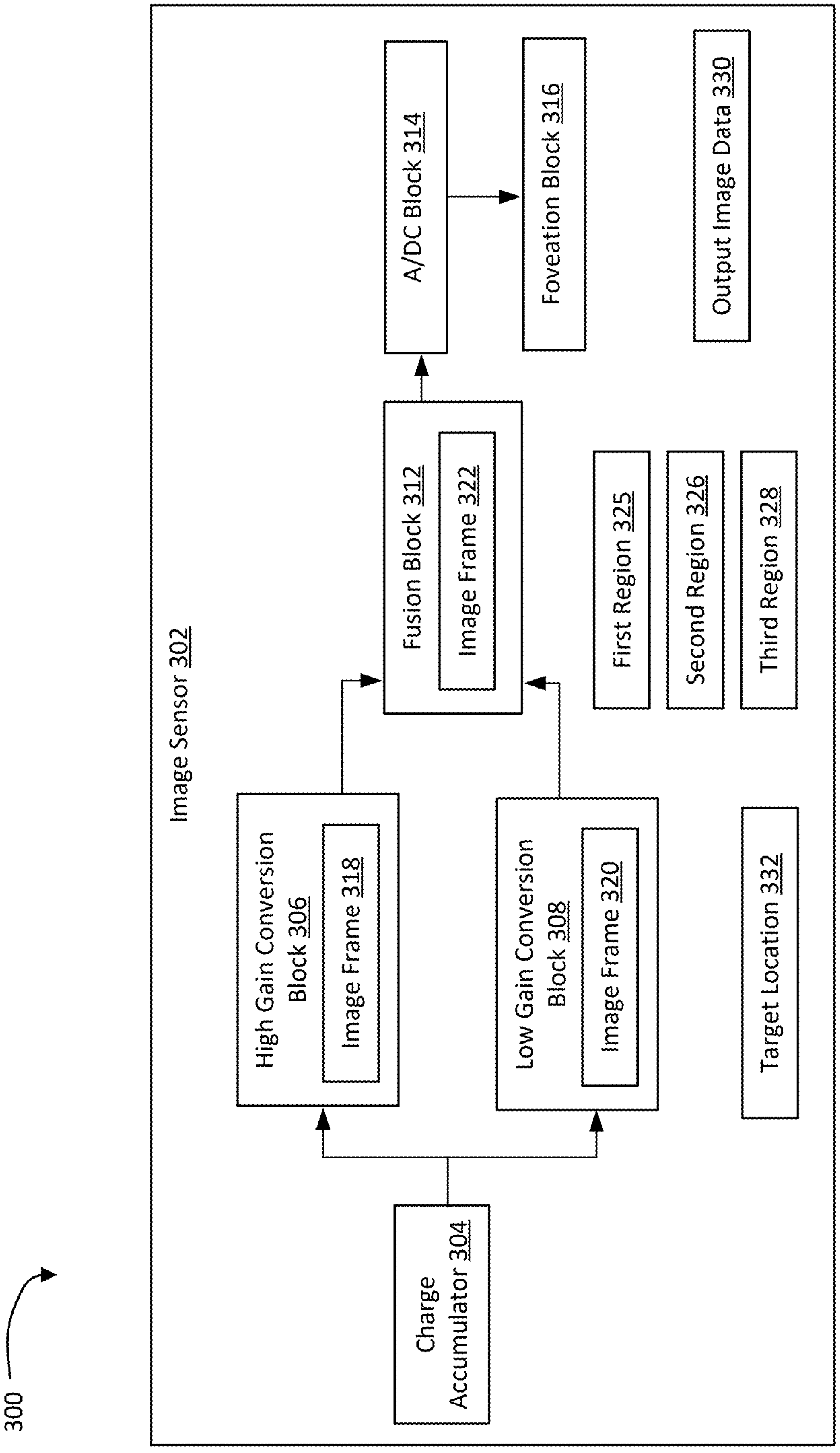
FIGS. 3A-3C depict systems for bit-depth adjustment according to some embodiments of the disclosure.
Figure 3B:
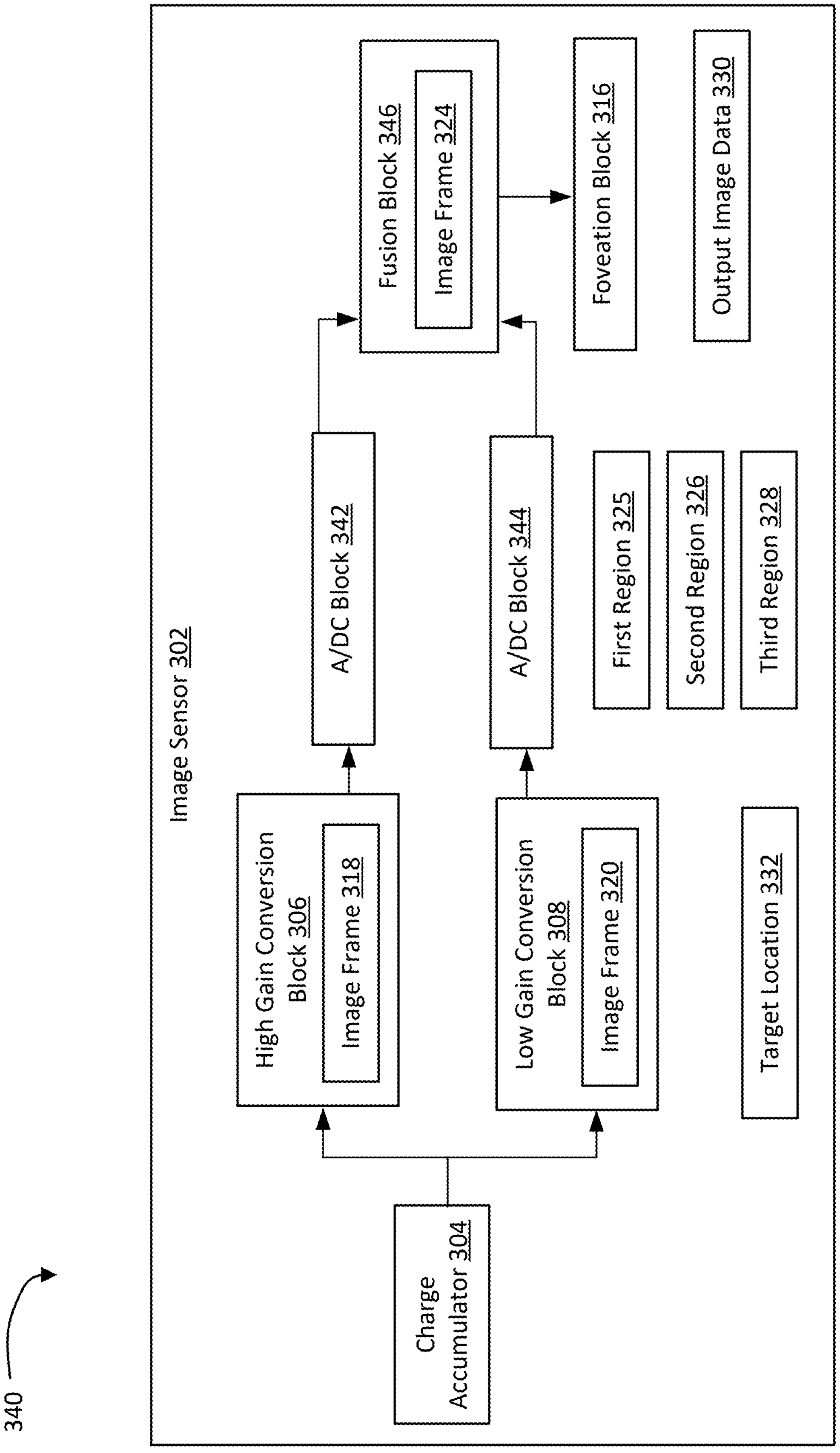

For example, FIGS. 3A and 3B depict systems 300, 340 for image sensor data capture and processing according to aspects of the present disclosure. The systems 300, 340 include exemplary embodiments of an image sensor 302, which may be a DCG image sensor. In certain implementations, the image sensor 302 may be an exemplary implementation of one or more of the image sensors 101, 102 of the device 100.

Starting with FIG. 3A, the image sensor 302, may be configured to collect outside light for individual pixels in the charge accumulator 304. The charge may then be converted to voltage by the conversion blocks 306, 308 to produce initial image frames. In particular, the image sensor may determine a high conversion gain (HCG) image frame 318 using the high gain conversion block 306 and a low conversion gain (LCG) image frame 320 using the low gain conversion block 308. The high gain conversion block 306 may be configured with higher gain settings for low light conditions to maximize sensitivity and detail capture. The low gain conversion block 308 may be configured with lower gain settings high light conditions, reducing sensitivity to prevent overexposure. The frames 318, 320 are then processed in fusion block 312 to create an image frame 322, which may also be referred to as a fused image frame, a DCG fused frame, and the like. The fusion block 312 may determine the image frame 322 by merging the HCG and LCG frames 318, 320 (such as on a pixel-by-pixel basis) using techniques that balance the exposure from both frames. For example, the fusion block 312 may be configured to select pixel values from image frame 318 where high sensitivity is needed, and to select pixel values from image frame 320 where lower sensitivity is needed. As another example, the fusion block 312 may prioritize data from image frame 318 for darker regions and data from image frame 320 for brighter regions.

The image frame 322 may then be converted to digital pixel values by the analog-to-digital converter (A/DC) block 314. In particular, the A/DC block 314 may be configured to convert analog voltage measurements for each of the pixels in the image frame 322 into corresponding digital values (e.g., with a certain bit-depth). To do so, the A/DC block 314 may utilize various techniques, such as successive approximation or sigma-delta modulation, to achieve the desired resolution and dynamic range in the digital output. For example, successive approximation A/D converters may be optimized for lower power consumption and faster conversion times, making them suitable for real-time imaging applications. Sigma-delta modulation, on the other hand, may provide higher resolution and better noise performance, making it advantageous for applications requiring high image quality and detail.

In FIG. 3A, the fusion of the image frames 318, 320 occurs before the A/DC block 314. In additional or alternative implementations, the A/DC may be performed before fusion. For example, in FIG. 3B the system 340 includes a configuration of the image sensor 302 in which separate A/DC blocks 342, 344 are used before fusion 346. In the system 340, the image frame 318 from the high gain conversion block 306 and the image frame 320 from the low gain conversion block 308 are first converted to digital data by their respective A/DC blocks 342, 344. In such instances, each of the A/DC blocks 342, 344 may be configured similarly to the A/DC block 314. The digital representations of these image frames are then passed to the fusion block 346, which combines them to create the image frame 324. In such instances, the fusion block 346 may be configured to use similar fusion techniques to those discussed above in connection with the fusion block 312. However, the fusion block 346 may be configured to fuse and otherwise manipulate digital pixel values instead of analog pixel values.

In either implementation, the image sensor 302 may be configured to receive at least one image frame 318, 320, 322, 324 and a target location 332. In certain implementations, the at least one image frame 318, 320, 322, 324 may include an HCG frame, an LCG frame, a DCG-fused image frame, or a combination thereof. In certain implementations, the at least one image frame 318, 320, 322, 324 may be received from one or more A/DC blocks 314, 342, 344, a fusion block 346, or a combination thereof.

In certain implementations, the target location 332 may include a target location within a field of view (FOV) of the sensor for higher resolution capture and processing. For example, the target location 332 could be the gaze location of a user within a VR or XR device, enabling enhanced image quality where the user is looking. As another example, the target location 332 could be a specific object or region of interest in a surveillance camera's FOV. In one more example, it could be a central area of interest during video conferencing to ensure clear capture of a speaker's face. The target location 332 may be determined by one or more sensors, such as eye-tracking sensors within a VR or XR device. For instance, a VR headset may include sensors (e.g., infrared sensors, position sensors, and the like) to track the user's eye movements in real-time, thereby determining the gaze direction and pinpointing the target location 332 for high-resolution image processing. The target location 332 may be determined by the computing device 100 itself, such as a CPU 104 of the device, an NPU of the device 100, an AI engine 124 of the device 100, an ISP 112 of the device 100, or a combination thereof. These computing components can process data from the eye-tracking sensors or other inputs to establish the target location for optimized image capture and processing.

The image sensor 302 may be configured to determine, based on the target location 332, a first region 325, a second region 326, and a third region 328 within the at least one image frame 318, 320, 322, 324. In certain implementations, the first region 325 may be centered on the target location 332 and may be identified for higher quality image processing than the other regions 326, 328 (such as processing targeting a higher bit-depth, a higher resolution, higher dynamic range, higher image quality, or a combination thereof). In certain implementations, the first region 325 may be a fovea region within the image frame 318, 320, 322, 324, intended for higher quality image processing, as this may be where a user's gaze is likely focused. The second region 326 may be a mid-fovea region intended for medium quality image processing, ensuring adequate quality in the surrounding area of the fovea region. The third region 328 may be a periphery region within the image frame 318, 320, 322, 324, intended for lower quality image processing, capturing the outermost areas. In certain implementations, the first region 325 may be surrounded by the second region 326, the second region 326 may be surrounded by the third region 328, or a combination thereof.

In various implementations, the relative sizes and/or dimensions of the different regions 325, 326, 328 may differ. In certain implementations, a width of the first region 325 may be greater than or equal to one quarter a width of the at least one image frame 318, 320, 324 and less than or equal to half the width of the at least one image frame 318, 320, 322, 324, a width of the second region 326 may be greater than or equal to half the width of the at least one image frame 318, 320, 322, 324 and less than or equal to three-quarters the width of the at least one image frame 318, 320, 322, 324, or a combination thereof. In certain implementations, the third region 328 may be the remaining portion(s) of the at least one image frame 318, 320, 322, 324, excluding the first region 325 and the second region 326. As one particular example, where the at least one image frame 318, 320, 322, 324 has a resolution of 4000×4000 pixels, the first region may be 2000×2000 pixels in size, the second region may be 3000×3000 pixels in size, and the third region may be 4000×4000 pixels in size.

Figure 4:
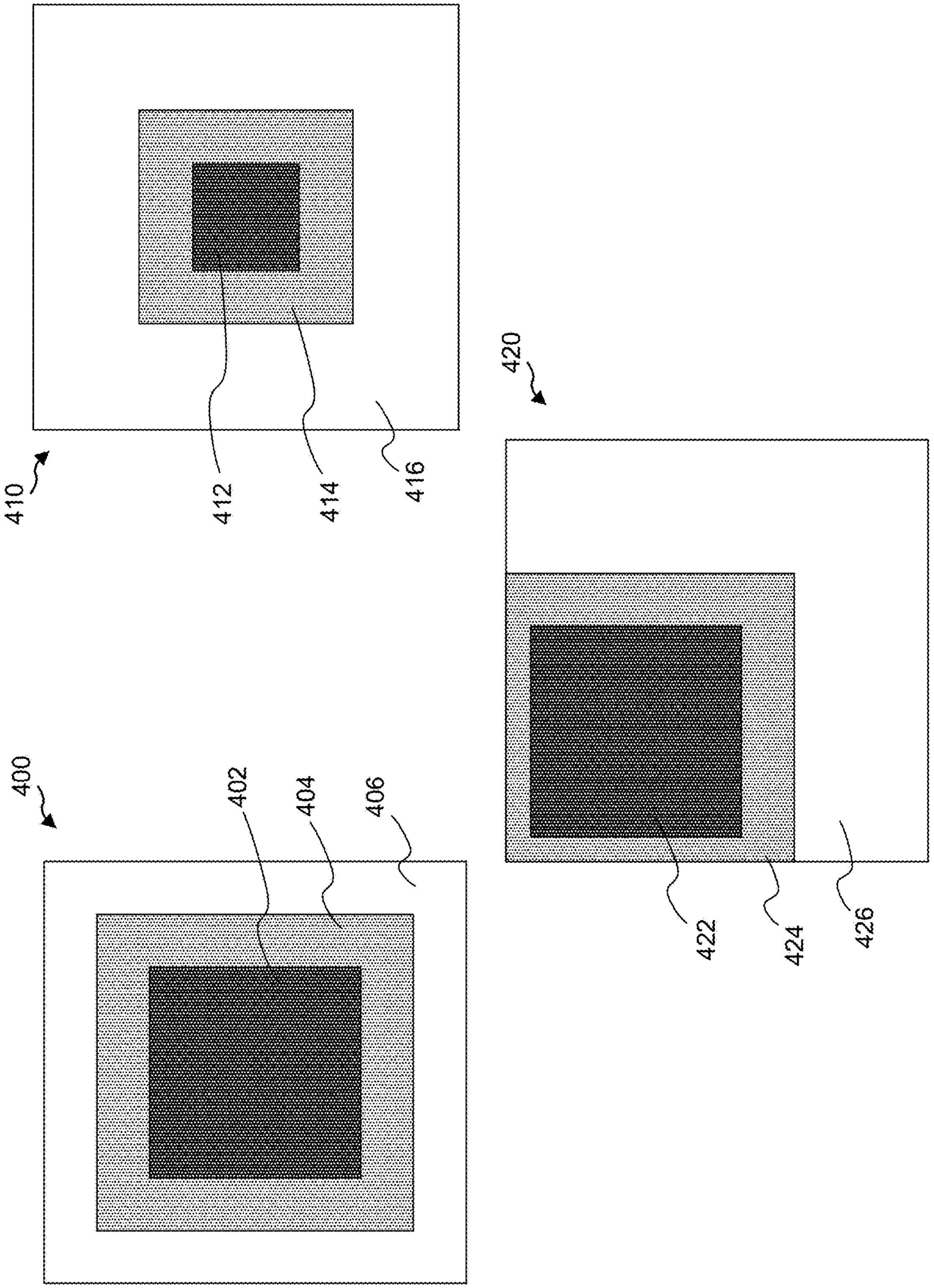
FIG. 4 depicts scenarios for region determination for bit-depth adjustment according to some embodiments of the present disclosure.

FIG. 4 depicts regions in various scenarios 400, 410, 420 according to exemplary aspects of the present disclosure. Scenario 400 includes a first region 402, a second region 404, and a third region 406, which may be exemplary implementations of the first region 325, the second region 326, and the third region 328. The image frame in scenario 400 is a square. The first region 402 is half the height and half the width of the image frame. The second region 404 surrounds the first region 402 and has three-quarters the height and width of the image frame, excluding the first region 402. The third region 406 encompasses the remaining portions of the image frame, excluding the first region 402 and the second region 404.

In scenario 410, the image frame also is a square and includes a first region 412, a second region 414, and a third region 416. The first region 412 is one-quarter the height and one-quarter the width of the image frame. The second region 414 surrounds the first region 412 and has half the height and half the width of the image frame, excluding the first region 412. The third region 416 includes the remaining portions of the image frame, excluding the first region 412 and the second region 414.

In scenario 420, the regions are the same size as in scenario 400, but the target location, such as a user's gaze, is no longer centered within the image frame. Instead, the target location is closer to the top left corner of the image frame. Accordingly, the first region 422, the second region 424, and the third region 426 are shifted towards the top left corner. In particular, the first region 422 is centered on the target location and is still half the height and half the width of the image frame. The second region 424 extends to three-quarters the height and width of the image frame, but is reduced according to the boundaries of the image frame due to the shifted target location. The third region 426 encompasses the remaining portions of the image frame, excluding the first region 422 and the second region 424.

Returning to FIGS. 3A and 3B, the image sensor 302 may be configured to determine, based on the at least one image frame 318, 320, 322, 324, an output image data 330 with (i) a first bit-depth in the first region 325, (ii) a second bit-depth in the second region 326, and (iii) a third bit-depth in the third region 328. In certain implementations, bit-depth may refer to the number of bits used to represent the color information of each pixel in a digital image. Higher bit-depth allows for a finer gradation of colors and more accurate color representation. For instance, a 16-bit depth can capture 65,536 levels of each color, while a 10-bit depth can capture 1,024 levels. In certain implementations, the first bit-depth may be the bit-depth of the images captured by the image sensor 302. For instance, the at least one image frame 318, 320, 322, 324 may be captured with the first bit-depth. In certain implementations, the second bit-depth may be at least two bits less than the first bit-depth, and the third bit-depth may be at least two bits less than the second bit-depth, or a combination thereof. For example, the first bit-depth may be 16 bits, the second bit-depth may be 14 bits, and the third bit-depth may be 10 bits, or a combination thereof.

The image sensor 302 may be configured to determine the first, second, and third bit-depths by shifting pixel data from the first image frame 318, 320, 322, 324 within the regions to corresponding bit-depths. In certain implementations, determining the output image data 330 includes determining adjusted image data in the second region 326 by adjusting a bit-depth of image data from the at least one image frame 318, 320, 322, 324 in the second region 326 to the second bit-depth and determining adjusted image data in the third region 328 by adjusting a bit-depth of image data from the at least one image frame 318, 320, 322, 324 in the third region 328 to the third bit-depth. This process may involve using right-shift operations or bit-shifting hardware to reduce the bit-depth of pixel values in the second and third regions. For example, the pixel data in the first region 325 could remain at the initial 16-bit depth, while the pixel data in the second region 326 could be right-shifted by two bits to achieve a 14-bit depth, and the pixel data in the third region 328 could be right-shifted by six bits to achieve a 10-bit depth.

In certain implementations, the at least one image frame 318, 320, 322, 324 may be captured by a DCG image sensor. In such instances, the adjusted image data may be determined by a fusion block 312, 346 of the DCG image sensor 302, an A/DC block 314 of the DCG image sensor 302, a foveation block 316 of the image sensor 302, or a combination thereof. For example, if the image sensor 302 performs fusion before A/DC conversion (as in the system 300), the image sensor 302 may perform the bit-depth adjustments in the A/DC block 314, the foveation block 316, or a combination thereof. In particular, the foveation block 316 may be configured to receive an image frame in a first resolution (such as a native resolution) and output separate image streams of the image frame with different resolutions, different FOVs, or a combination thereof. Different resolutions may be determined by downsampling the received image frame. Different FOVs may be determined by cropping the received image frame to a desired FOV. In certain implementations, the foveation block 316 may be further configured to perform bit-depth adjustments using the techniques described above (such as in addition to adjusting the resolution, FOV, or a combination thereof). As another example, if the image sensor 302 performs fusion after A/DC conversion (as in the system 340), the image sensor may perform the bit-depth adjustments in the fusion block 346, the foveation block 316, or a combination thereof. In implementations where the bit-depth adjustments are not performed in the foveation block 316, the inputs and processing blocks of the foveation block 316 may be adjusted to receive and process image data with different bit rates. In certain implementations, performing bit-depth adjustments before the foveation block 316 may save on total wire line width requirements in the image sensor 302. For example, for a 4000×4000 pixel image sensor, performing bit-depth adjustments may reduce line buffer widths from 8000 bytes to 7000 bytes for the foveation block 316.

The image sensor 302 may be configured to determine the output image data 330 by determining brightness measures for the at least one image frame 318, 320, 322, 324 and at least one previous image frame 318, 320, 322, 324, determining that the brightness measures satisfy at least one condition, and determining, based on determining that the brightness measures satisfy the at least one condition, at least one of the first bit-depth, the second bit-depth, and the third bit-depth. In certain implementations, different types of brightness measures and statistics may be used. For example, the brightness measures may include exposure statistics, which may measure the amount of light that reaches a sensor during image capture and may be represented as a grid where each cell contains information about the exposure level in a particular region. As another example, the brightness measures may include pixel mean values calculate the average brightness level of all the pixels within a specified region. As a further example, the brightness measures may include histograms, which may indicate the distribution of pixel intensities within an image or region. As another example, the brightness measures may include a standard deviation of pixel values measures the variability or dispersion of pixel intensities around the mean value, with higher standard deviations indicating higher contrast and variability in brightness. As a further example, the brightness measures may include brightness ratios, which may include calculating the ratio between higher and lower intensity levels within a region, such as the ratio of bright pixels to dark pixels, which can give an indication of the contrast and dynamic range within that region. In certain implementations, the brightness measures may be determined for a plurality of previous image frames 318, 320, 322, 324, such as the last 3 image frames, the last 5 image frames, the last 10 image frames, the last 20 image frames, and the like.

Determining that the brightness measures satisfy at least one condition may include determining whether brightness is stable across evaluated image frames, as indicated by the at least one condition. In certain implementations, the at least one condition may include one or more of a weighted average of brightness measures being consistent across frames, no more than a maximum change in one or more brightness measures, and the like. In certain implementations, determining at least one of the first bit-depth, the second bit-depth, and the third bit-depth includes determining a dynamic range of the at least one image frame 318, 320, 322, 324 (such as one or more of the first region, the second region, and the third region of the at least one image frame 318, 320, 322, 324). In certain implementations, determining the second bit-depth based on (i) the dynamic range and (ii) one or both of the first bit-depth or the second bit-depth. For instance, the determination of the bit-depths can be based on a ratio of higher to lower intensity levels within the regions. For example, if the dynamic range ratio is four, the second bit rate may be determined as 12 bits while the third bit rate may be determined as 10 bits, (e.g., because two additional bits are sufficient to cover a dynamic range ratio of four between the second region and the third region). In certain implementations, constraints on the bit-depths may include ensuring that the periphery region uses a minimum supported bit-depth supported, such as 10 bits, while the fovea region uses a maximum supported bit-depth, such as 16 bits. For instance, if the ratio of high to low intensities is consistent, the mid-fovea region might dynamically adjust to 12 bits from an initial 14-bit configuration. In instances where the at least one condition is not satisfied, the image sensor 302 may be configured to use a default or other predetermined set of bit-depths (such as a first bit-depth of 16 bits, a second bit-depth of 14 bits, and a third bit-depth of 10 bits).

In certain implementations, the image sensor 302 may be further configured to adjust the resolutions of one or more of the regions 325, 326, 328 (such as in addition to adjusting the bit-depths). For example, if the at least one image frame 318, 320, 322, 324 has a first resolution, the image sensor 302 may be configured to determine the output image data 330 by determining adjusted image data in the second region 326 by adjusting a resolution of image data from the at least one image frame 318, 320, 322, 324 in the second region 326 to the second resolution and determining adjusted image data in the third region 328 by adjusting a resolution of image data from the at least one image frame 318, 320, 322, 324 in the third region 328 to the third resolution. In certain implementations, the second resolution may be half of the first resolution, the third resolution may be one-quarter the first resolution, the third resolution may be half of the second resolution, or a combination thereof. For example, if the first resolution is 4000×4000 pixels, the second resolution might be adjusted to 2000×2000 pixels (or equivalent for the size of the second region 326), and the third resolution might be adjusted to 1000×1000 pixels (or equivalent for the size of the third region 328). In certain implementations, a foveation block 316 of the image sensor 302 may be configured to perform the resolution adjustment and determine the adjusted image data.

The image sensor 302 may be configured to the first region 325, the second region 326, and the third region 328 of the output image data 330 are separately output to an ISP for subsequent processing. In certain implementations, the ISP may have a multi-context front end that may be capable of receiving different bit-depths and different parts of an image for separate processing. This multi-context front end allows the ISP to handle the varying bit-depths and resolutions from the different regions efficiently. For instance, the first region 325 with the highest bit-depth and resolution can be processed separately from the second region 326 and the third region 328, which have progressively lower bit-depths and resolutions. Additionally, having separate contexts able to separately receive image data with different bit depths may reduce the front end size of the ISP, as noted above.

Figure 3C:
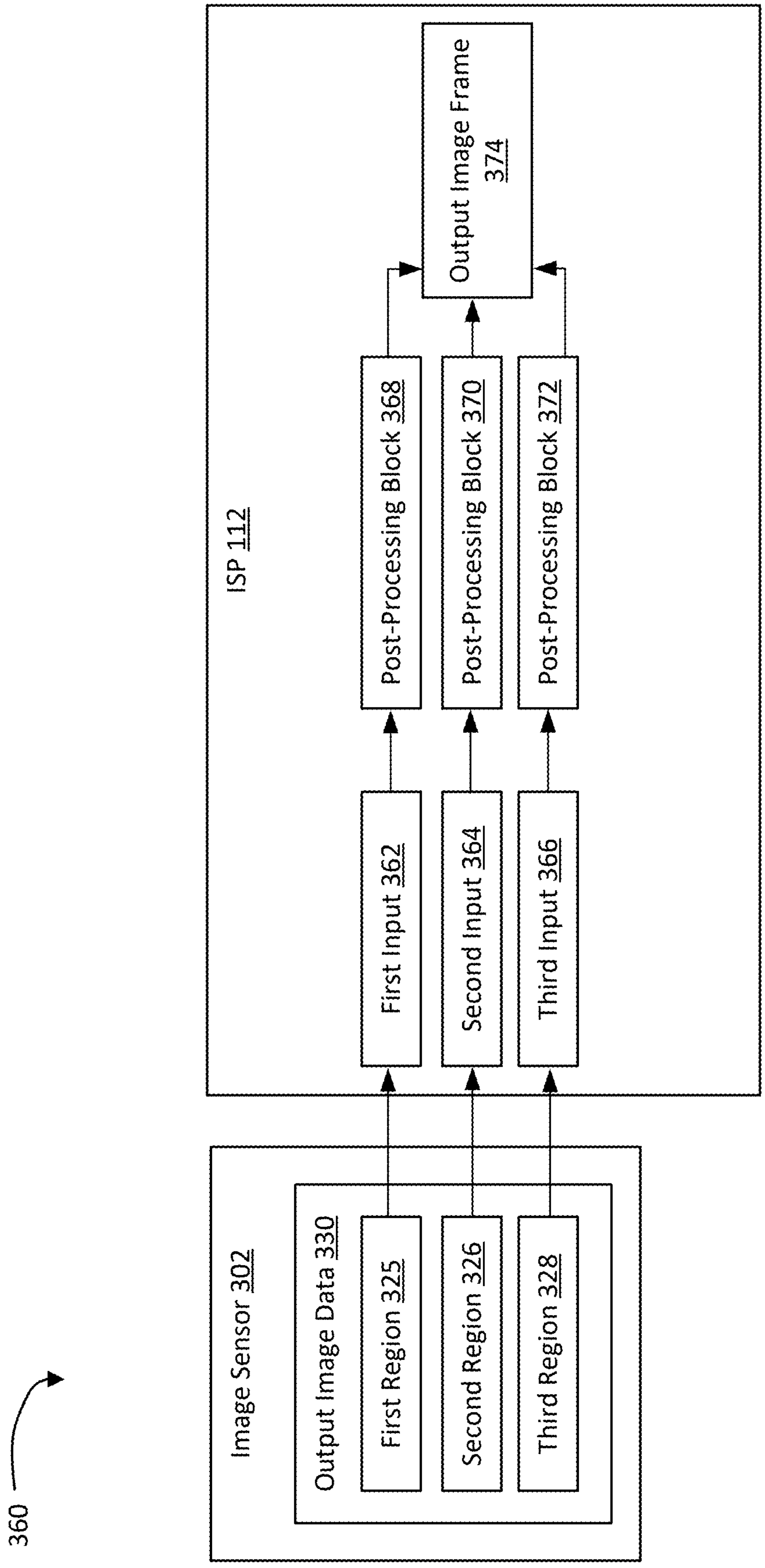

One such example is shown in FIG. 3C, which depicts a system 360 according to one aspect of the present disclosure. The image sensor 302 determines output image data 330 that includes the first region 325, the second region 326, and the third region 328, as described above. The output image data 330 is transmitted to the ISP 112, which has a multi-context front end. Specifically, the first region 325 is sent to the first input 362 of the ISP 112, the second region 326 is sent to the second input 364, and the third region 328 is sent to the third input 366. Each of these inputs is managed by a corresponding post-processing block within the ISP 112: the first input 362 is managed by the first post-processing block 368, the second input 364 is managed by the second post-processing block 370, and the third input 366 is managed by the third post-processing block 372.

This multi-context approach allows the ISP 112 to tailor its processing capabilities to the specific needs of each region. For example, the first region 325, which may require the highest bit-depth and resolution, is processed by the first post-processing block 368 using maximum resource allocation to ensure high image quality, and may thus be the largest processing block among the blocks 368, 370, 372. The second region 326, which may have a moderate bit-depth and resolution, is processed by the second post-processing block 370 with optimized settings that balance quality and resource efficiency, and may be smaller than the block 368. The third region 328, which may have the lowest bit-depth and resolution, is processed by the third post-processing block 372, prioritizing efficiency, and may be smaller than the block 370.

This configuration not only ensures that each region is processed according to its specific requirements but also optimizes the overall resource usage of the ISP 112. In certain embodiments, the multi-context ISP 112 might also include specialized filters or enhancement algorithms in each post-processing block, tailored to handle different levels of noise, color correction, and detail enhancement specific to the bit-depth and resolution of each region. For example, the first post-processing block 368 could employ advanced noise reduction and color enhancement filters to maximize the image quality of the fovea region, while the third post-processing block 372 might use simpler techniques or may omit particular steps to quickly process the third region 328.

The examples discussed above focus on implementations where the image sensor 302 is configured to determine three different bit-depths for three different regions within received image frames. In various alternative implementations, the image sensor 302 may be configured to use a different number of regions (such as two regions, 4 regions, 5 regions, 10 regions, and the like).

Figure 5:
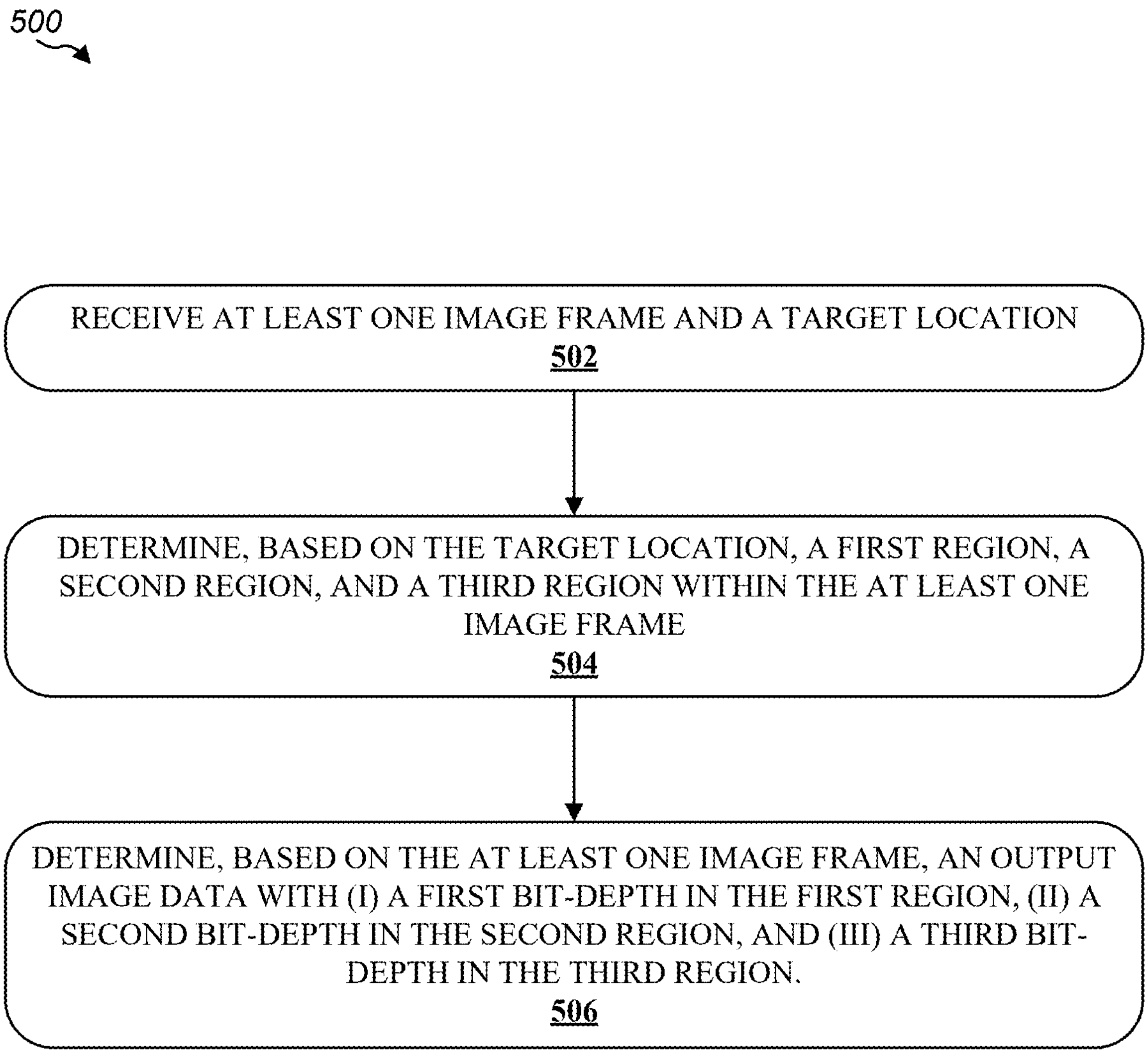
FIG. 5 shows a flow chart of an example method for bit-depth adjustment of image data according to some embodiments of the disclosure.

The system 200 of FIG. 2 may be configured to perform the operations described with reference to FIGS. 3A-3C to determine output image data. FIG. 5 shows a flow chart of an example method for processing image data to dynamically adjust bit-depth according to some embodiments of the disclosure. The capturing in FIGS. 3A-3C may obtain an improved digital representation of a scene, which results in a photograph or video with higher image quality (IQ). The capturing in FIGS. 3A-3C may also enable more efficient image data capture and processing, such as in XR applications.

The method 500 includes receive at least one image frame and a target location (block 502). For example, the image sensor 302 may receive at least one image frame 318, 320, 324 and a target location 332. In certain implementations, the at least one image frame 318, 320, 324 may include an HCG frame 318, an LCG frame 320, a DCG-fused image frame 324, or a combination thereof.

The method 500 includes determining, based on the target location, a first region, a second region, and a third region within the at least one image frame (block 504). For example, the image sensor 302 may determine, based on the target location 332, a first region 325, a second region 326, and a third region 328 within the at least one image frame 318, 320, 322, 324. In certain implementations, the first region 325 may be centered on the target location 332 and may be identified for higher quality image processing. In certain implementations, the first region 325 may be surrounded by the second region 326, the second region 326 may be surrounded by the third region 328, or a combination thereof. In certain implementations, the third region 328 may be the remaining portion(s) of the at least one image frame 318, 320, 322, 324, excluding the first region 325 and the second region 326.

The method 500 includes determining, based on the at least one image frame, an output image data with (i) a first bit-depth in the first region, (ii) a second bit-depth in the second region, and (iii) a third bit-depth in the third region (block 506). For example, the image sensor 302 may determine, based on the at least one image frame 318, 320, 322, 324, an output image data 330 with (i) a first bit-depth in the first region 325, (ii) a second bit-depth in the second region 326, and (iii) a third bit-depth in the third region 328.

In certain implementations, determining the output image data 330 includes determining adjusted image data in the second region 326 by adjusting a bit-depth of image data from the at least one image frame 318, 320, 322, 324 in the second region 326 to the second bit-depth. In certain implementations and determining adjusted image data in the third region 328 by adjusting a bit-depth of image data from the at least one image frame 318, 320, 322, 324 in the third region 328 to the third bit-depth. In certain implementations, the at least one image frame 318, 320, 322, 324 may be captured by a DCG image sensor 302. In such instances, the adjusted image data may be determined by a fusion block 346 of the DCG image sensor 302, an A/DC block 314 of the DCG image sensor 302, a foveation block 316 of the image sensor 302, or a combination thereof.

In certain implementations, determining the output image data 330 includes determining brightness measures for the at least one image frame 318, 320, 322, 324 and at least one previous image frame 318, 320, 322, 324, determining that the brightness measures satisfy at least one condition, and determining, based on determining that the brightness measures satisfy the at least one condition, at least one of the first bit-depth, the second bit-depth, and the third bit-depth. In certain implementations, determining at least one of the first bit-depth, the second bit-depth, and the third bit-depth includes determining a dynamic range of the at least one image frame 318, 320, 322, 324 and determining the second bit-depth based on (i) the dynamic range and (ii) one or both of the first bit-depth or the second bit-depth.

In certain implementations, the at least one image frame 318, 320, 322, 324 has a first resolution. In such instances, determining the output image data 330 may include determining adjusted image data in the second region 326 by adjusting a resolution of image data from the at least one image frame 318, 320, 322, 324 in the second region 326 to the second resolution, and determining adjusted image data in the third region 328 by adjusting a resolution of image data from the at least one image frame 318, 320, 322, 324 in the third region 328 to the third resolution. In certain implementations, the second resolution may be half of the first resolution, the third resolution may be one-quarter the first resolution, the third resolution may be half of the second resolution, or a combination thereof.

In certain implementations, the image sensor 302 may the first region 325, the second region 326, and the third region 328 of the output image data 330 are separately output to an ISP 112 for subsequent processing.

In one or more aspects, techniques for supporting image processing may include additional aspects, such as any single aspect or any combination of aspects described below or in connection with one or more other processes or devices described elsewhere herein.

A first aspect provides a method that includes receiving at least one image frame and a target location; determining, based on the target location, a first region, a second region, and a third region within the at least one image frame; and determining, based on the at least one image frame, an output image data with (i) a first bit-depth in the first region, (ii) a second bit-depth in the second region, and (iii) a third bit-depth in the third region.

In a second aspect, in combination with the first aspect, the first region is centered on the target location and is identified for higher bit-depth image processing.

In a third aspect, in combination with the first or second aspect, the at least one image frame has the first bit-depth, wherein the second bit-depth is at least two bits less than the first bit-depth, the third bit-depth is at least two bits less than the second bit-depth, or a combination thereof.

In a fourth aspect, in combination with one or more of the first through third aspects, the first bit-depth is 16 bits, the second bit-depth is 14 bits, the third bit-depth is 10 bits, or a combination thereof.

In a fifth aspect, in combination with one or more of the first through fourth aspects, determining the output image data comprises determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

In a sixth aspect, in combination with the fifth aspect, the at least one image frame is captured by a dual conversion gain (DCG) image sensor, and the adjusted image data is determined by a fusion block of the DCG image sensor, an A/DC block of the DCG image sensor, a foveation block of the image sensor, or a combination thereof.

In a seventh aspect, in combination with one or more of the first through sixth aspects, determining the output image data comprises determining brightness measures for the at least one image frame and at least one previous image frame; determining that the brightness measures satisfy at least one condition; and determining, based on determining that the brightness measures satisfy the at least one condition, at least one of the first bit-depth, the second bit-depth, and the third bit-depth.

In an eighth aspect, in combination with the seventh aspect, determining at least one of the first bit-depth, the second bit-depth, and the third bit-depth comprises determining a dynamic range of at least one of the first region, the second region, and the third region of the at least one image frame; and determining the second bit-depth based on (i) the dynamic range and (ii) one or both of the first bit-depth or the second bit-depth.

In a ninth aspect, in combination with one or more of the first through eighth aspects, the at least one image frame has a first resolution, and determining the output image data comprises determining adjusted image data in the second region by adjusting a resolution of image data from the at least one image frame in the second region to a second resolution; and determining adjusted image data in the third region by adjusting a resolution of image data from the at least one image frame in the third region to a third resolution.

In a tenth aspect, in combination with the ninth aspect, the second resolution is half of the first resolution, the third resolution is one-quarter the first resolution, the third resolution is half of the second resolution, or a combination thereof.

In an eleventh aspect, in combination with one or more of the first through tenth aspects, the first region, the second region, and the third region of the output image data are separately output to an image signal processor (ISP) for subsequent processing.

A twelfth aspect provides an apparatus that includes an image sensor configured to receive at least one image frame and a target location; determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region. Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirteenth aspect, in combination with the twelfth aspect, determining the output image data comprises determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

In a fourteenth aspect, in combination with the twelfth aspect or the thirteenth aspect, determining the output image data comprises determining brightness measures for the at least one image frame and at least one previous image frame; determining that the brightness measures satisfy at least one condition; and determining, based on determining that the brightness measures satisfy the at least one condition, at least one of the first bit-depth, the second bit-depth, and the third bit-depth.

In a fifteenth aspect, in combination with the fourteenth aspect, determining at least one of the first bit-depth, the second bit-depth, and the third bit-depth comprises determining a dynamic range of at least one of the first region, the second region, and the third region of the at least one image frame; and determining the second bit-depth based on (i) the dynamic range and (ii) one or both of the first bit-depth or the second bit-depth.

In a sixteenth aspect, in combination with one or more of the twelfth aspect through the sixteenth aspect, the at least one image frame has a first resolution, and determining the output image data comprises determining adjusted image data in the second region by adjusting a resolution of image data from the at least one image frame in the second region to a second resolution; and determining adjusted image data in the third region by adjusting a resolution of image data from the at least one image frame in the third region to a third resolution.

In a seventeenth aspect, in combination with one or more of the twelfth through sixteenth aspects, the first region, the second region, and the third region of the output image data are separately output to an image signal processor (ISP) for subsequent processing.

An eighteenth aspect provides an image capture device that includes an image sensor configured to receive at least one image frame and a target location; determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region.

In a nineteenth aspect, in combination with the eighteenth aspect, determining the output image data comprises determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

In a twentieth aspect, in combination with the eighteenth aspect or the nineteenth aspect, determining the output image data comprises determining brightness measures for the at least one image frame and at least one previous image frame; determining that the brightness measures satisfy at least one condition; and determining, based on determining that the brightness measures satisfy the at least one condition, at least one of the first bit-depth, the second bit-depth, and the third bit-depth.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3C include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIGS. 1-3C.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as “upper” and “lower,” or “front” and back,” or “top” and “bottom,” or “forward” and “backward” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:

receiving at least one image frame and a target location;

determining, based on the target location, a first region, a second region, and a third region within the at least one image frame; and determining, based on the at least one image frame, an output image data with (i) a first bit-depth in the first region, (ii) a second bit-depth in the second region, and (iii) a third bit-depth in the third region.

2. The method of claim 1, wherein the first region is centered on the target location and is identified for higher bit-depth image processing.

3. The method of claim 1, wherein the at least one image frame has the first bit-depth, wherein the second bit-depth is at least two bits less than the first bit-depth, the third bit-depth is at least two bits less than the second bit-depth, or a combination thereof.

4. The method of claim 3, wherein the first bit-depth is 16 bits, the second bit-depth is 14 bits, the third bit-depth is 10 bits, or a combination thereof.

5. The method of claim 1, wherein determining the output image data comprises:

determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

6. The method of claim 5, wherein the at least one image frame is captured by a dual conversion gain (DCG) image sensor, and wherein the adjusted image data is determined by a fusion block of the DCG image sensor, an A/DC block of the DCG image sensor, a foveation block of the image sensor, or a combination thereof.

7. The method of claim 1, wherein determining the output image data comprises:

determining brightness measures for the at least one image frame and at least one previous image frame;

determining that the brightness measures satisfy at least one condition; and determining, based on determining that the brightness measures satisfy the at least one condition, at least one of the first bit-depth, the second bit-depth, and the third bit-depth.

8. The method of claim 7, wherein determining at least one of the first bit-depth, the second bit-depth, and the third bit-depth comprises:

determining a dynamic range of at least one of the first region, the second region, and the third region of the at least one image frame; and determining the second bit-depth based on (i) the dynamic range and (ii) one or both of the first bit-depth or the second bit-depth.

9. The method of claim 1, wherein the at least one image frame has a first resolution, and wherein determining the output image data comprises:

determining adjusted image data in the second region by adjusting a resolution of image data from the at least one image frame in the second region to a second resolution; and determining adjusted image data in the third region by adjusting a resolution of image data from the at least one image frame in the third region to a third resolution.

10. The method of claim 9, wherein the second resolution is half of the first resolution, the third resolution is one-quarter the first resolution, the third resolution is half of the second resolution, or a combination thereof.

11. The method of claim 1, wherein the first region, the second region, and the third region of the output image data are separately output to an image signal processor (ISP) for subsequent processing.

12. An apparatus, comprising:

an image sensor configured to:

receive at least one image frame and a target location;

determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region.

13. The apparatus of claim 12, wherein determining the output image data comprises:

determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

14. The apparatus of claim 12, wherein determining the output image data comprises:

determining brightness measures for the at least one image frame and at least one previous image frame;

determining that the brightness measures satisfy at least one condition; and determining, based on determining that the brightness measures satisfy the at least one condition, at least one of the first bit-depth, the second bit-depth, and the third bit-depth.

15. The apparatus of claim 14, wherein determining at least one of the first bit-depth, the second bit-depth, and the third bit-depth comprises:

determining a dynamic range of at least one of the first region, the second region, and the third region of the at least one image frame; and determining the second bit-depth based on (i) the dynamic range and (ii) one or both of the first bit-depth or the second bit-depth.

16. The apparatus of claim 12, wherein the at least one image frame has a first resolution, and wherein determining the output image data comprises:

determining adjusted image data in the second region by adjusting a resolution of image data from the at least one image frame in the second region to a second resolution; and determining adjusted image data in the third region by adjusting a resolution of image data from the at least one image frame in the third region to a third resolution.

17. The apparatus of claim 12, wherein the first region, the second region, and the third region of the output image data are separately output to an image signal processor (ISP) for subsequent processing.

18. An image capture device, comprising:

an image sensor configured to:

receive at least one image frame and a target location;

determine, based on the target location, a first region, a second region, and a third region within the at least one image frame; and determine, based on the at least one image frame, an output image data with (i) a first bit-depth in the first region, (ii) a second bit-depth in the second region, and (iii) a third bit-depth in the third region.

19. The image capture device of claim 18, wherein determining the output image data comprises:

determining adjusted image data in the second region by adjusting a bit-depth of image data from the at least one image frame in the second region to the second bit-depth; and determining adjusted image data in the third region by adjusting a bit-depth of image data from the at least one image frame in the third region to the third bit-depth.

20. The image capture device of claim 18, wherein determining the output image data comprises:

determining brightness measures for the at least one image frame and at least one previous image frame;

determining that the brightness measures satisfy at least one condition; and determining, based on determining that the brightness measures satisfy the at least one condition, at least one of the first bit-depth, the second bit-depth, and the third bit-depth.

* * * * *